United States Patent
Guo et al.

(10) Patent No.: US 11,186,763 B2
(45) Date of Patent: Nov. 30, 2021

(54) ACID SENSITIVE EMULSIFIER FOR USE IN SUBTERRANEAN TREATMENT OPERATIONS

(71) Applicant: Halliburton Energy Services, Inc., Houston, TX (US)

(72) Inventors: Li Guo, Humble, TX (US); William Walter Shumway, Spring, TX (US); Jay Paul Deville, Spring, TX (US); Kingsley Ihueze Nzeadibe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/490,787

(22) PCT Filed: Oct. 12, 2018

(86) PCT No.: PCT/US2018/055675
§ 371 (c)(1),
(2) Date: Sep. 3, 2019

(87) PCT Pub. No.: WO2020/076342
PCT Pub. Date: Apr. 16, 2020

(65) Prior Publication Data
US 2020/0369945 A1    Nov. 26, 2020

(51) Int. Cl.
*C09K 8/584* (2006.01)
*C09K 8/035* (2006.01)
(Continued)

(52) U.S. Cl.
CPC .............. *C09K 8/584* (2013.01); *C09K 8/035* (2013.01); *C09K 8/36* (2013.01); *C09K 8/602* (2013.01); *C09K 2208/34* (2013.01)

(58) Field of Classification Search
CPC .......... C09K 8/58; C09K 8/584; C09K 8/035; C09K 8/32; C09K 8/36; C09K 8/34; C09K 8/602; C09K 2208/34; C09K 2208/06
See application file for complete search history.

(56) References Cited

U.S. PATENT DOCUMENTS

| 5,888,944 A | 3/1999 | Patel |
|---|---|---|
| 5,905,061 A | 5/1999 | Patel |

(Continued)

FOREIGN PATENT DOCUMENTS

| CN | 103980869 A | 8/2014 | |
|---|---|---|---|
| GB | 2309240 A | 7/1997 | |
| WO | WO-8911516 A1 * | 11/1989 | ............... C09K 8/36 |

OTHER PUBLICATIONS

International Search Report and Written Opinion issued in related PCT Application No. PCT/US2018/055675 dated Jul. 11, 2019, 12 pages.

*Primary Examiner* — Angela M DiTrani Leff
(74) *Attorney, Agent, or Firm* — Tenley Krueger; Baker Botts L.L.P.

(57) ABSTRACT

Methods and systems for using an invert emulsion fluid that is beneficial in the drilling, completing and working over of subterranean wells are provided. In some embodiments, the method includes: preparing a treatment fluid including an invert emulsion, wherein the invert emulsion further includes an aqueous dispersed phase, an oleaginous continuous phase, and an amine surfactant emulsifier and placing the treatment fluid in a wellbore penetrating at least portion of a subterranean formation.

9 Claims, 1 Drawing Sheet

(51) Int. Cl.
*C09K 8/36* (2006.01)
*C09K 8/60* (2006.01)

(56) References Cited

U.S. PATENT DOCUMENTS

| | | |
|---|---|---|
| 6,218,342 B1 | 4/2001 | Patel |
| 6,822,039 B1 | 11/2004 | Monfreux-Gaillard et al. |
| 9,745,501 B1 * | 8/2017 | Jiang ..................... C09K 8/035 |
| 2001/0051593 A1 * | 12/2001 | Patel ........................ C09K 8/32 |
| | | 507/129 |
| 2012/0165231 A1 | 6/2012 | Miller et al. |
| 2016/0319183 A1 * | 11/2016 | Vo .......................... E21B 43/26 |
| 2017/0283680 A1 * | 10/2017 | Chen ........................ C09K 8/36 |
| 2018/0223165 A1 | 8/2018 | Wagle et al. |
| 2019/0055448 A1 * | 2/2019 | Mohammed ............. C09K 8/34 |
| 2019/0055452 A1 * | 2/2019 | Mohammed ........... C09K 8/032 |

\* cited by examiner

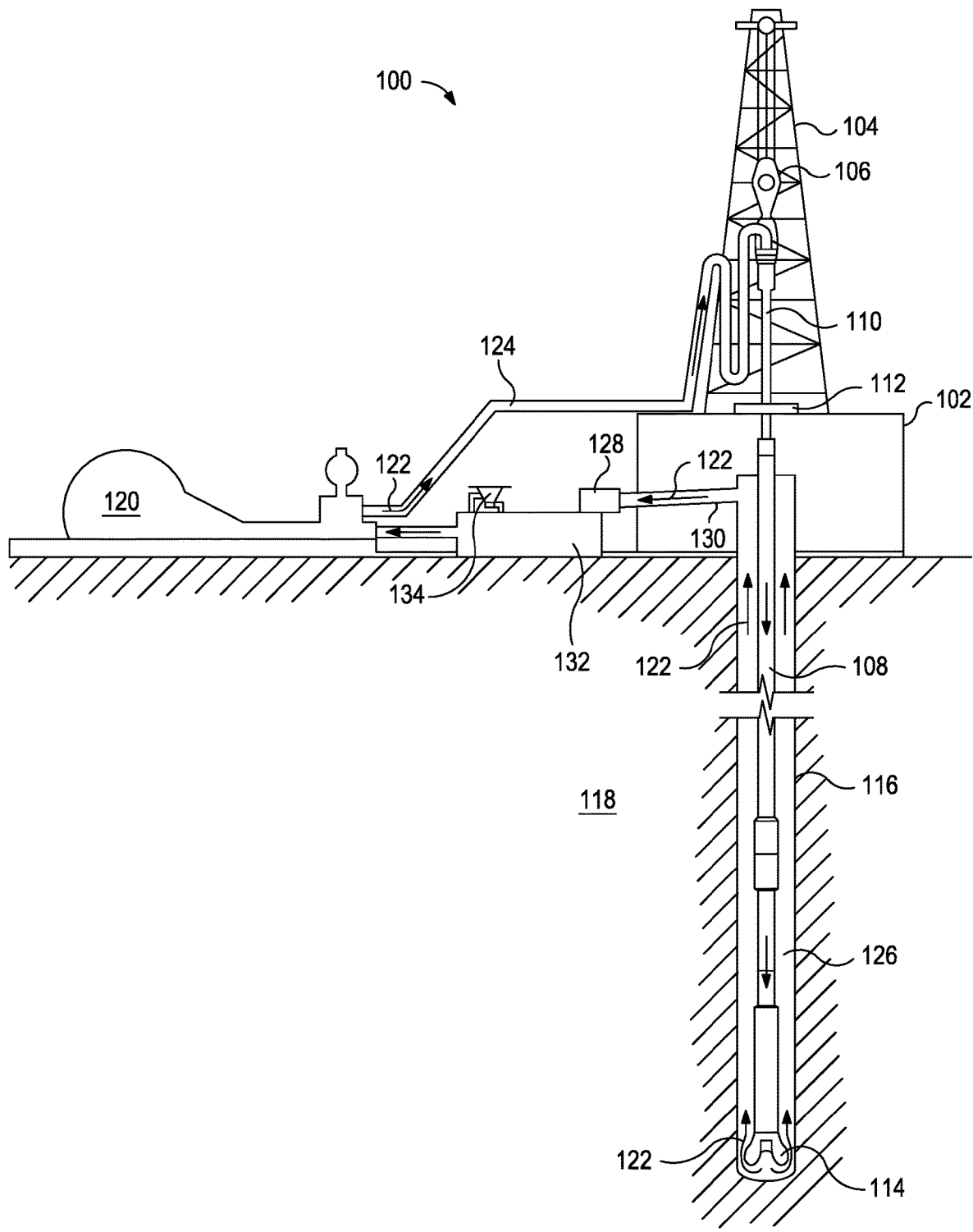

ACID SENSITIVE EMULSIFIER FOR USE IN SUBTERRANEAN TREATMENT OPERATIONS

CROSS-REFERENCE TO RELATED APPLICATION

The present application is a U.S. National Stage Application of International Application No. PCT/US2018/055675 filed Oct. 12, 2018, which is incorporated herein by reference in its entirety for all purposes.

BACKGROUND

The present disclosure relates to methods and systems for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

A drilling fluid or mud is circulated through a wellbore as the wellbore is being drilled to facilitate the drilling operation. Various functions of a drilling fluid include, but are not limited to, removing drill cuttings from the wellbore, cooling and lubricating the drill bit, aiding in support of the drill pipe and drill bit, and providing a hydrostatic head to maintain the integrity of the wellbore walls and prevent well blowouts. Certain muds used in drilling may include: a base oil (or synthetic fluid) including the external phase of an invert emulsion; a saline, aqueous solution including the internal phase of the invert emulsion; emulsifiers at the interface of the internal and external phases; and other agents or additives for suspension, weight or density, oil-wetting, fluid loss or filtration control, and rheology control. Oil-based or invert emulsion-based drilling fluids may be selected for many reasons, including, but not limited to: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. Oil-based or invert emulsion-based muds may provide excellent lubrication qualities. These lubrication properties may permit the drilling of wells having a significant vertical deviation, as is typical of off-shore or deep-water drilling operations or when a horizontal well is desired. In such highly deviated holes, torque and drag on the drill string may be a significant problem because the drill pipe lies against the low side of the hole, and the risk of pipe sticking is high when water-based muds are used. In contrast, oil-based or invert emulsion-based muds may provide a thin, slick filter cake which may help to prevent pipe sticking and thus the use of the oil-based mud can be justified.

BRIEF DESCRIPTION OF THE DRAWINGS

These drawings illustrate certain aspects of some of the embodiments of the present disclosure and should not be used to limit or define the claims.

FIGURE is a diagram illustrating an example of a well bore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to stable emulsions that may be broken by acid treatment and methods and systems relating to their use in downhole treatment operations.

The present disclosure provides methods and systems for using an invert emulsion fluid in the drilling, completing and working over of subterranean wells, e.g., oil and gas wells. As used herein, the term "emulsion" refers to a dispersion of two immiscible liquids (e.g., an aqueous phase and an oil phase) having a continuous phase and a dispersed or internal phase. The interfacial tension between an oleaginous fluid (oil phase) and a non-oleaginous fluid (aqueous phase) is often high. Thus, if the liquids are mixed together they spontaneously separate from each other when the agitation ceases, to minimize the interfacial area. Lowering the interfacial tension with an emulsifier enables one liquid to form a stable dispersion of fine droplets in the other. The lower the interfacial tension, the smaller the droplets and the more stable the emulsion. In some emulsions, the oleaginous fluid is the dispersed phase and the non-oleaginous fluid is the continuous phase. However, "invert emulsions," in which the non-oleaginous fluid is the dispersed phase and the oleaginous fluid is the continuous phase, can be formed with the use of suitable emulsifiers. In particular, the present disclosure provides an invert emulsion fluid that includes an oleaginous fluid, a non-oleaginous fluid, and an amine surfactant as an emulsifier.

The fluids of the present disclosure may be useful in the drilling, completion and working over of subterranean oil and gas wells. In particular, the fluids of the present disclosure may be useful in formulating drilling muds and completion fluids that facilitate removal of a filter cake from a subterranean formation or well bore. Such muds and fluids may be especially useful in drilling horizontal wells into hydrocarbon bearing formations. Any known method may be used to prepare the drilling fluids of the present disclosure in a manner analogous to those normally used, to prepare conventional invert emulsion drilling fluids. In one representative procedure, a desired quantity of oleaginous fluid such as a base oil and a suitable amount of amine emulsifier are mixed together and the remaining components (e.g., the non-oleaginous fluid) are added sequentially with continuous mixing. In some embodiments, an invert emulsion of the present disclosure may be formed by vigorously agitating, mixing or shearing the oleaginous fluid and the non-oleaginous fluid.

The oleaginous fluid of the present disclosure is a natural or synthetic oil, or a mixture thereof. The oleaginous fluid may be selected from the group including diesel oil; mineral oil; a natural oil, such as refined paraffin or vegetable oil; a synthetic oil, such as polyolefins, synthetic paraffins, esters, alpha-olefins, internal olefins, polydiorganosiloxanes, siloxanes, or organosiloxanes; and mixtures thereof. The concentration of the oleaginous fluid should be sufficient so that an invert emulsion forms and may be less than about 99% by volume of the invert emulsion. In some embodiments, the amount of oleaginous fluid is from about 30% to about 99% by volume. In some embodiments, the amount of oleaginous fluid is from about 40% to about 98%. In some embodiments, the amount of oleaginous fluid is from about 50% to about 97%. In some embodiments, the amount of oleaginous fluid is from about 70% to about 90%. The oleaginous fluid, in some embodiments, may include at least 5% by volume of a material selected from the group including ethers, acetals, dialkylcarbonates, hydrocarbons, and combinations thereof.

The non-oleaginous fluid in the invert emulsion fluid of the present disclosure is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. In some embodiments, the amount of non-oleaginous fluid is present in an amount of less that about 70% by volume of the invert emulsion fluid, e.g., from about 1% to about 70% by volume of the invert emulsion fluid. In some embodiments, the non-oleaginous fluid is present in an amount of from about 2% to about 60% by volume of the invert emulsion fluid. In some embodiments, the non-oleaginous fluid is present in an amount of from about 3% to about 50% by volume of the invert emulsion fluid. In some embodiments, the non-oleaginous fluid is present in an amount of from about 10% to about 30% by volume of the invert emulsion fluid.

The invert emulsion fluids of the present disclosure may be characterized in terms of various properties, for example, plastic viscosity. In some embodiments, the invert emulsion fluids of the present disclosure may have a plastic viscosity in the range of from about 10 to about 160 cP. In some embodiments, the invert emulsion fluids of the present disclosure may have a plastic viscosity in the range of from about 15 to about 75 cP. In some embodiments, the invert emulsion fluids of the present disclosure may have a plastic viscosity in the range of from about 20 to about 50 cP.

The invert emulsion fluids may also be characterized in terms of yield point. In some embodiments, the invert emulsion fluids of the present disclosure may have a yield point in the range of from about 2 to about 65 lb/100 ft$^2$. In some embodiments, the invert emulsions of the present disclosure may have a yield point in the range of from about 5 to about 40 lb/100 ft$^2$. In some embodiments, the invert emulsion fluids of the present disclosure may have a yield point in the range of from about 8 to about 30 lb/100 ft$^2$. In some embodiments, the invert emulsion fluids of the present disclosure may have a yield point in the range of from about 10 to about 25 lb/100 ft$^2$.

The invert emulsion fluids may also be characterized in terms of 10 second gel strength. In some embodiments, the invert emulsion fluids of the present disclosure may have a 10 second gel strength in the range of from about 3 to about 50 lb/100 ft$^2$. In some embodiments, the invert emulsion fluids of the present disclosure may have a 10 second gel strength in the range of from about 5 to about 30 lb/100 ft$^2$. In some embodiments, the invert emulsion fluids of the present disclosure may have a 10 second gel strength in the range of from about 7 to about 20 lb/100 ft$^2$.

The invert emulsion fluids may also be characterized in terms of 10 minute gel strength. In some embodiments, the invert emulsion fluids of the present disclosure may have a 10 minute gel strength in the range of from about 3 to about 65 lb/100 ft$^2$. In some embodiments, the invert emulsion fluids of the present disclosure may have a 10 minute gel strength in the range of from about 5 to about 40 lb/100 ft$^2$. In some embodiment, the invert emulsion fluids of the present disclosure may have a 10 minute gel strength in the range of from about 7 to about 30 lb/100 ft$^2$.

The invert emulsion fluids may also be characterized in terms of electric stability. In some embodiments, the invert emulsion fluids of the present disclosure may have an electric stability in the range of from about 50 to about 2000 volts. In some embodiments, the invert emulsion fluids of the present disclosure may have an electric stability in the range of from about 100 to about 1600 volts. In some embodiments, the invert emulsion fluids of the present disclosure may have an electric stability in the range of from about 250 to about 1200 volts. In some embodiments, the invert emulsion fluids of the present disclosure may have an electric stability in the range of from about 300 to about 1000 volts. In some embodiments, the electric stability of the invert emulsion fluids is greater than 100 volts, or alternatively, greater than 150 volts.

When a majority of the amine is in its unprotonated form, an invert emulsion may be formed in which the oleaginous liquid is the continuous phase and the non-oleaginous liquid is the discontinuous phase. That is to say, the unprotonated form of the amine surfactant is able to stabilize an invert emulsion. In certain embodiments, upon addition of a protonating agent, herein referred to as an acid, that is capable of protonating a major portion of the amine surfactant, the invert emulsion may be "broken." In other words, the oleaginous phase and non-oleaginous phase may separate and return to an unmixed state. The amount of amine surfactant present in the invert emulsion fluid of the present disclosure should be sufficient to stabilize the invert emulsion. For example, in some embodiments, a stable emulsion will remain substantially emulsified for more than about 1 minute after the halting of the agitation or shearing motion that forms the emulsion. The concentration of the amine emulsifier may vary depending on the particular components in the drilling fluid or mud. In some embodiments, the concentration of the amine emulsifier is less than about 10% by volume of the fluid. In some embodiments, the amine surfactant is present in the invert emulsion fluid at a concentration of 0.1% to 10.0% by volume of the fluid. In some embodiments, the amine surfactant may be present in a concentration of 0.1% to 5.0% by volume of the fluid. In some embodiment, the amine surfactant may be present in a concentration of 1% to 5.0% by volume of the fluid.

The amine surfactants of the present disclosure may have the following structure:

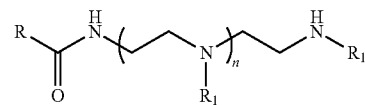

wherein n is an integer in the range of from 1 to 5; each $R_1$ has a structure selected from the group consisting of: a hydrogen,

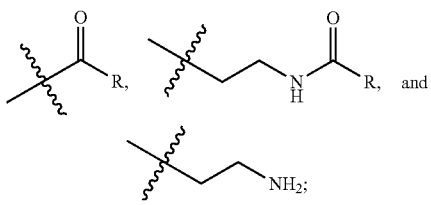

and R is a $C_{10}$ to $C_{25}$ hydrocarbon chain. In some embodiments, n may be an integer in the range of from 1 to 4. In some embodiments, n may be 1. In some embodiments, each $R_1$ in the compound may have the same chemical structure. In other embodiments, each $R_1$ in the compound may have different chemical structures. In some embodiments, at least one of the $R_1$ groups is

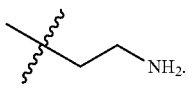

In some embodiments, the terminal $R_1$ group, or last $R_1$ group on the molecular chain is

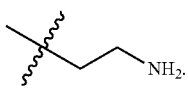

As noted above, the addition of an acid or acid source causes the invert emulsion to break. The acid should be capable of protonating the amine surfactant. Further, the acid should be of sufficient strength to protonate the amine surfactant so as to cause the invert emulsion to break (e.g., cause the phases of the dispersion to separate, or cause the conversion of the emulsion from an invert emulsion to a regular emulsion). In some embodiments, the acid may be provided in an amount of from about 1% to about 10% by volume of the fluid. In some embodiments, this amount is greater than about 1 equivalent of acid and, may be about 0.1 to about 10 equivalents of acid. Compounds that may be suitable for use as an acid include, mineral acids and organic acids preferably soluble in water. Examples of mineral acids include hydrochloric acid, sulfuric acid, nitric acid, phosphoric acid, hydrofluoric acid, hydrobromic acid and the like. Examples of organic acids include citric acid, tartaric acid, acetic acid, propionic acid, glycolic acid, lactic acid, halogenated organic acids, butyric acid, organosulfonic acids, organophosphoric acids, and the like. Acid generating sources, or compounds that generate acid upon dissolution in water, may also be used, for example, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, carbon dioxide, and similar such compounds.

Among the many potential advantages to the methods and compositions of the present disclosure, only some of which are alluded to herein, the methods, compositions, and systems of the present disclosure may provide efficient, cost-effective invert emulsion breaking solutions. In some instances, oil-based drilling muds, or invert emulsions, may be difficult to effectively break and remove from a wellbore or other environment. Conventional invert emulsion drilling fluids often require substantial cleaning, including washing the filter cake with detergents and an acid wash to dissolve the filter cake particles. This process often requires numerous additional chemicals and substantial quantities of time. In some embodiments, use of the fluids of the present disclosure may result in a cleaner wellbore without substantial additional cleaning treatments, thereby increasing effectiveness of subsequent cementing and completions operations.

Another potential advantage to the methods and compositions of the present disclosure is the ability to reduce and/or eliminate storage of difficult to break invert emulsion fluids and provide for "flow to host" applications. In some cases, conventional invert emulsion drilling fluids may be difficult to break using conventional means, and thus may necessitate recovery and storage. The amine surfactant emulsifiers of the present disclosure may be capable of breaking old invert emulsion-based drilling fluids in storage. By adding the amine surfactant emulsifiers of the present disclosure along with an appropriate protonating acid, it may be possible to recover expensive components that were otherwise trapped in the stored invert emulsions. Further, in some embodiments, the invert emulsions of the present disclosure may not require any type of storage after drilling operations were completed. In fact, after addition of an acid to break the invert emulsion using the methods and compositions of the present disclosure, in some embodiments, it may be possible to flow the drilling fluid straight to the downstream facilities for processing. This application is known as "flow to host" as no additional measures are required to remove the invert emulsion drilling fluid before beginning production from the well. Additionally, the acid sensitive emulsifiers could also be used to break oil invert emulsion based drilling fluids in order to facilitate removal of low gravity solids. This can make reconditioning of those fluids easier and more cost-efficient.

In certain embodiments, the treatment fluids used in the methods and systems of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e ethylene glycol), and the like. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the additives of the present disclosure and/or other components of the treatment fluid may be metered directly into a base treatment fluid to form a treatment fluid. In certain embodiments, the base fluid may be mixed with the additives of the present disclosure and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used as a drilling fluid in drilling at least a portion of a well bore to penetrate at least a portion of a subterranean formation. In certain embodiments, a treatment fluid may be introduced into a subterranean formation. In certain embodiments, the treatment fluid may be introduced into a well bore that penetrates a subterranean formation.

The fluids disclosed herein may directly or indirectly affect one or more components or pieces of equipment associated with the preparation, delivery, recapture, recycling, reuse, and/or disposal of the disclosed additives and fluids. For example, and with reference to FIGURE, the disclosed fluids may directly or indirectly affect one or more components or pieces of equipment associated with an example of a wellbore drilling assembly 100, according to some embodiments. It should be noted that while FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In some embodiments, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed fluids and/or additives may directly or indirectly affect the components and equipment of the drilling assembly 100. For example, the disclosed fluids and/or additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the disclosed fluids and/or additives.

The disclosed fluids and/or additives may directly or indirectly affect the pump 120, which representatively includes any conduits, pipelines, trucks, tubulars, and/or pipes used to fluidically convey the fluids and/or additives downhole, any pumps, compressors, or motors (e.g., topside or downhole) used to drive the fluids and/or additives into motion, any valves or related joints used to regulate the pressure or flow rate of the fluids and/or additives, and any sensors (i.e., pressure, temperature, flow rate, etc.), gauges, and/or combinations thereof, and the like. The disclosed fluids and/or additives may also directly or indirectly affect the mixing hopper 134 and the retention pit 132 and their assorted variations.

The disclosed fluids and/or additives may also directly or indirectly affect the various downhole equipment and tools that may come into contact with the fluids and/or additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids and/or additives may also directly or indirectly affect any downhole heat exchangers, valves and corresponding actuation devices, tool seals, packers and other wellbore isolation devices or components, and the like associated with the wellbore 116. The disclosed fluids and/or additives may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids and/or additives may also directly or indirectly affect any transport or delivery equipment used to convey the fluids and/or additives to the drilling assembly 100 such as, for example, any transport vessels, conduits, pipelines, trucks, tubulars, and/or pipes used to fluidically move the fluids and/or additives from one location to another, any pumps, compressors, or motors used to drive the fluids and/or additives into motion, any valves or related joints used to regulate the pressure or flow rate of the fluids and/or additives, and any sensors (i.e., pressure and temperature), gauges, and/or combinations thereof, and the like.

An embodiment of the present disclosure is a method that includes: preparing a treatment fluid including an invert emulsion, wherein the invert emulsion includes an aqueous internal phase, an oleaginous continuous phase, and an amine surfactant emulsifier having the molecular structure

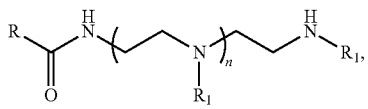

wherein n is an integer in the range of from 1 to 5 and R is a $C_{10}$ to $C_{25}$ hydrocarbon chain; and placing the treatment fluid in a wellbore penetrating at least portion of a subterranean formation.

In one or more embodiments described in the preceding paragraph, the method further includes injecting an acid or acid source into the wellbore; contacting at least a portion of the treatment fluid with the acid or acid source; and breaking the invert emulsion. In one or more embodiments described above, the step of breaking the invert emulsion further includes protonating the amine surfactant emulsifier. In one or more embodiments described above, the method further includes removing the treatment fluid from the wellbore; storing the treatment fluid at an offsite location; injecting an acid or acid source into the treatment fluid after storing the treatment fluid; contacting at least a portion of the treatment fluid with the acid or acid source; and breaking the invert emulsion. In one or more embodiments described above, n is an integer in the range of from 1 to 4. In one or more embodiments described above, n is 1. In one or more embodiments described above, each $R_1$ is selected from the group consisting of: a hydrogen;

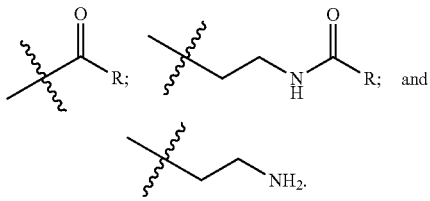

In one or more embodiments described above, at least one $R_1$ is

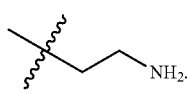

In one or more embodiments described above, a terminal $R_1$ is

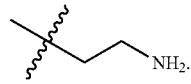 [SMILES: *CCN]

In one or more embodiments described above, the amine surfactant emulsifier is present in the treatment fluid in a concentration of from about 0.1% to about 10.0% by volume of the treatment fluid. In one or more embodiments described above, the method further includes flowing the treatment fluid from the wellbore to a downstream processing facility.

Another embodiment of the present disclosure is a method that includes: providing a drilling fluid including an invert emulsion, wherein the invert emulsion further includes an aqueous internal phase, an oleaginous continuous phase, and an amine surfactant having the molecular structure

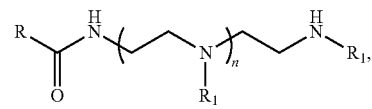

wherein n is an integer in the range of from 1 to 5 and R is a $C_{10}$ to $C_{25}$ hydrocarbon chain; and using the drilling fluid to drill a wellbore penetrating at least a portion of a subterranean formation.

In one or more embodiments described in the preceding paragraph, the method further includes injecting an acid or acid source into the wellbore; contacting at least a portion of the treatment fluid with the acid or acid source; and breaking the invert emulsion. In one or more embodiments described above, each $R_1$ is selected from the group consisting of: a hydrogen;

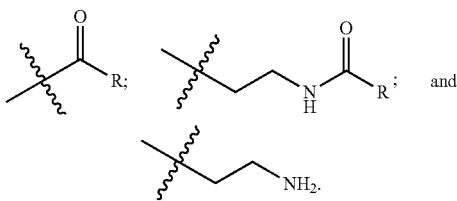

In one or more embodiments described above, at least one $R_1$ is

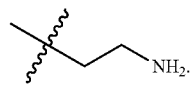 [SMILES: *CCN]

In one or more embodiments described above, n is an integer in the range of from 1 to 4. In one or more embodiments described above, n is 1.

Another embodiment of the present disclosure is an invert emulsion including: an aqueous internal phase; an oleaginous continuous phase; and an amine surfactant emulsifier having the structure

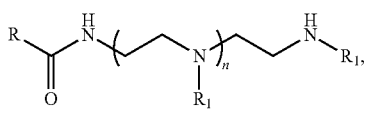

wherein n is an integer in the range of from 1 to 5 and R is a $C_{10}$ to $C_{25}$ hydrocarbon chain.

In one or more embodiments described in the preceding paragraph, each $R_1$ is selected from the group consisting of: a hydrogen;

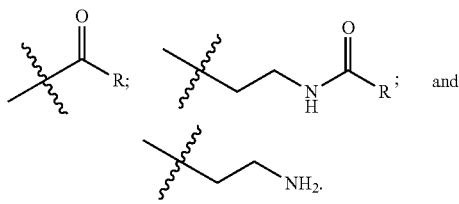

In one or more embodiments described above, at least one $R_1$ is

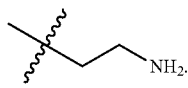

To facilitate a better understanding of the present disclosure, the following examples of certain aspects of certain embodiments are given. The following examples are not the only examples that could be given according to the present disclosure and are not intended to limit the scope of the disclosure or claims.

Example 1

Three separate samples were prepared to test the rheological properties of the amine surfactant emulsifiers of the present disclosure. Each sample was prepared as a representative treatment fluid including an invert emulsion in accordance with one or more embodiments of the present disclosure. Each sample contained an amine surfactant emulsifier as described in the present disclosure. The composition of each sample treatment fluid is shown in Table 1 below. The samples are labeled below as Sample 1, Sample 2, and Sample 3. For comparison purposes, the tests were also performed on an invert emulsion treatment fluid including an EZ MUL® emulsifier, commercially available from Halliburton Energy Services. All tests were performed using a multimixer for formulating and re-mixing the sample fluids. The samples were hot rolled at a temperature of 200° F. A Fann™ 45 APV rheometer was used for all rheological measurements. A Fann™ electrical stability meter with probe was used to measure the electrical stability of the samples.

A sag test was performed on the samples using the following procedure. First, the free fluid on top of a sample was measured by syringing it out into a graduated cylinder. This extracted free fluid was then kept in a separate mixing cup and not added back to the top layer of the mud. Next, a clean dry 100 mL sag test cup with lid was weight and recorded as W0. Tap water was then added to the cup until completely filled with the lid placed on top. The cup and lid were properly wiped clean of excess fluid and then weighed. This weight was recorded as $W_{water}$. The volume of the sag test cup volume was then calculated using the Formula 1 below.

$$Sag\ Test\ Cup\ Volume = \frac{W_{water} - W0}{\text{specific gravity of water}} \quad (1)$$

The top 3 cm of the sample was then scooped into the sag cup and gently tapped to expel any trapped air bubbles. The lid was then placed back on the sag test cup and the cup was weighed again. This weight was recorded as W1. The density of the top layer (D1) was then calculated according to the following formula:

$$D1 = \frac{W1 - W0}{Sag\ Test\ Cup\ Volume} \quad (2)$$

The sag test cup was then emptied and cleaned. Next, 100 mL may be obtained from a middle layer of the sample. This 100 mL was then mixed and scooped into the sag test cup and weighed. This weight was recorded as W2. The density of this bottom layer of the sample was then calculated according to Formula 3 below.

$$D2 = \frac{W2 - W0}{Sag\ Test\ Cup\ Volume} \quad (3)$$

Next, all but the last 100 mL of the sample was removed from the sample container. The last 100 mL was then mixed and scooped into the sag test cup and weighed. This weight was recorded as W3. The density of this bottom layer of the sample was then calculated according to Formula 4 below.

$$D3 = \frac{W3 - W0}{Sag\ Test\ Cup\ Volume} \quad (4)$$

The Sag Factor was then calculated according to Formula 5 below.

$$Sag\ Factor = \frac{sg\ of\ bottom\ layer,\ D3}{sg\ of\ top\ layer,\ D1 + sg\ of\ bottom\ layer,\ D3} \quad (5)$$

The results of these Sag Factor calculations and standard rheological measurements are also shown in Table 1 and Table 2 below.

TABLE 1

|  | Commercial EZ MUL | | | Sample 1 | | |
| --- | --- | --- | --- | --- | --- | --- |
| Rolled, hrs, 200° F. | 0 | 16 | SA 120 h | 0 | 16 | SA 120 h |
| Rheology Temp, F. | 120 | 120 | 120 | 120 | 120 | 120 |
| 600 rpm | 110 | 127 | 119 | 117 | 132 | 120 |
| 300 rpm | 66 | 76 | 70 | 69 | 78 | 69 |
| 200 rpm | 50 | 57 | 53 | 51 | 59 | 50 |
| 100 rpm | 32 | 36 | 33 | 32 | 36 | 30 |
| 6 rpm | 8 | 9 | 9 | 8 | 8 | 6 |

TABLE 1-continued

|  | Commercial EZ MUL | | | Sample 1 | | |
| --- | --- | --- | --- | --- | --- | --- |
| Rolled, hrs, 200° F. | 0 | 16 | SA 120 h | 0 | 16 | SA 120 h |
| 3 rpm | 7 | 7 | 7 | 7 | 7 | 5 |
| Plastic viscosity, cP | 44 | 51 | 49 | 48 | 54 | 51 |
| Yield point, lb/100 ft$^2$ | 22 | 25 | 21 | 21 | 24 | 18 |
| 10 Sec gel, lb/100 ft$^2$ | 8 | 8 | 7 | 7 | 8 | 6 |
| 10 Min gel, lb/100 ft$^2$ | 8 | 9 | 8 | 8 | 11 | 7 |
| Electric Stability | 286 | 465 | 400 | 265 | 426 | 420 |
| Oil seperation, ml | | | <1 | | | <1 |
| Sag factor | | | 0.53 | | | 0.53 |

TABLE 2

|  | Sample 2 | | | Sample 3 | | |
| --- | --- | --- | --- | --- | --- | --- |
| Rolled, hrs, 200° F. | 0 | 16 | SA 120 h | 0 | 16 | SA 120 h |
| Rheology Temp, F. | 120 | 120 | 120 | 120 | 120 | 120 |
| 600 rpm | 101 | 97 | 92 | 94 | 87 | 90 |
| 300 rpm | 61 | 58 | 54 | 54 | 52 | 52 |
| 200 rpm | 45 | 44 | 40 | 39 | 39 | 38 |
| 100 rpm | 29 | 27 | 25 | 24 | 24 | 23 |
| 6 rpm | 8 | 7 | 7 | 5 | 5 | 6 |
| 3 rpm | 7 | 6 | 6 | 4 | 4 | 5 |
| Plastic viscosity, cP | 40 | 39 | 38 | 40 | 35 | 38 |
| Yield point, lb/100 ft$^2$ | 21 | 19 | 16 | 14 | 17 | 14 |
| 10 Sec gel, lb/100 ft$^2$ | 7 | 7 | 6 | 5 | 5 | 6 |
| 10 Min gel, lb/100 ft$^2$ | 8 | 7 | 7 | 6 | 6 | 6 |
| Electric Stability | 625 | 390 | 437 | 615 | 370 | 442 |
| Oil seperation, ml | | | 10 | | | 6.5 |
| Sag factor | | | 0.55 | | | 0.53 |

As shown above, each of Sample 1, Sample 2, and Sample 3 exhibited characteristics of a strong invert emulsion even after 120 hours of testing.

Example 2

The invert emulsions of Example 1 were then tested to determine their response to treatment with an acid breaker. Each of Sample 1, Sample 2, and Sample 3 was treated with both water and an HCl solution. Further, an invert emulsion including EZ MUL® was also treated with both water and an HCl solution for comparison purposes. The results of these tests are shown in Table 3 and Table 4 below.

TABLE 3

|  | Commercial EZ MUL | | | | Sample 1 | | | |
| --- | --- | --- | --- | --- | --- | --- | --- | --- |
| Rolled, hrs, 200° F. | 0 | 16 | Treat with water | Treat with HCl | 0 | 16 | Treat with water | Treat with HCl |
| Rheology Temp, F. | 120 | 120 | 120 | 120 | 120 | 120 | 120 | 120 |
| 600 rpm | 107 | 128 | 202 | 113 | 121 | 139 | 206 | 100 |
| 300 rpm | 65 | 76 | 124 | 66 | 70 | 82 | 129 | 60 |
| 200 rpm | 49 | 59 | 95 | 49 | 52 | 62 | 99 | 44 |
| 100 rpm | 32 | 37 | 62 | 29 | 32 | 39 | 66 | 25 |
| 6 rpm | 8 | 9 | 17 | 6 | 6 | 10 | 19 | 2 |
| 3 rpm | 7 | 8 | 13 | 5 | 5 | 9 | 15 | 2 |
| Plastic viscosity, cP | 42 | 52 | 78 | 47 | 51 | 57 | 77 | 40 |
| Yield point, lb/100 ft$^2$ | 23 | 24 | 46 | 19 | 19 | 25 | 52 | 20 |
| 10 Sec gel, lb/100 ft$^2$ | 8 | 8 | 13 | 6 | 5 | 9 | 15 | 1 |
| 10 Min gel, lb/100 ft$^2$ | 8 | 9 | 14 | 6 | 6 | 10 | 16 | 2 |
| Electric Stability | 436 | 602 | 282 | 155 | 203 | 300 | 248 | 50 |

TABLE 4

|  | Sample 2 | | | | Sample 3 | | | |
| --- | --- | --- | --- | --- | --- | --- | --- | --- |
| Rolled, hrs, 200° F. | 0 | 16 | Treat with water | Treat with HCl | 0 | 16 | Treat with water | Treat with HCl |
| Rheology Temp, F. | 120 | 120 | 120 | 120 | 120 | 120 | 120 | 120 |
| 600 rpm | 110 | 98 | 146 | 82 | 94 | 91 | 129 | 73 |
| 300 rpm | 67 | 59 | 89 | 51 | 55 | 54 | 80 | 45 |
| 200 rpm | 51 | 45 | 68 | 38 | 40 | 40 | 60 | 33 |
| 100 rpm | 32 | 28 | 43 | 23 | 24 | 24 | 38 | 20 |
| 6 rpm | 8 | 7 | 9 | 3 | 5 | 6 | 8 | 3 |
| 3 rpm | 7 | 6 | 8 | 2 | 4 | 5 | 7 | 2 |
| Plastic viscosity, cP | 43 | 39 | 57 | 31 | 39 | 37 | 49 | 28 |
| Yield point, lb/100 ft$^2$ | 24 | 20 | 32 | 20 | 16 | 17 | 31 | 17 |
| 10 Sec gel, lb/100 ft$^2$ | 7 | 7 | 8 | 3 | 5 | 5 | 7 | 2 |
| 10 Min gel, lb/100 ft$^2$ | 8 | 8 | 9 | 3 | 5 | 6 | 8 | 3 |
| Electric Stability | 437 | 259 | 175 | 20 | 645 | 531 | 274 | 11 |

As shown above, each of Sample 1, Sample 2, and Sample 3 indicated an electric stability of less than or equal to 50 volts when treated with the HCl solution. In contrast, the EZ MUL® based invert emulsion exhibited an electric stability of 155 volts.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:

providing a treatment fluid comprising an invert emulsion, wherein the invert emulsion further comprises an aqueous internal phase, an oleaginous continuous phase, and an amine surfactant having the molecular structure

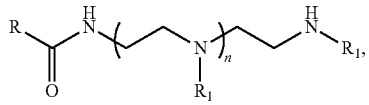

wherein n is an integer in the range of from 1 to 5, R is a $C_{10}$ to $C_{25}$ hydrocarbon chain, a terminal $R_1$ is selected from the group consisting of: a hydrogen,

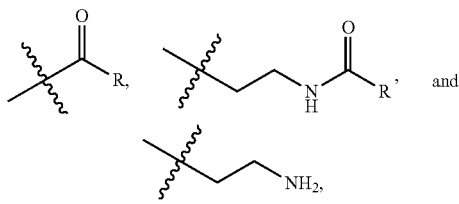

and a non-terminal $R_1$ is selected from the group consisting of:

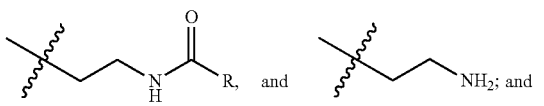

placing the treatment fluid in a wellbore penetrating at least a portion of a subterranean formation.

2. The method of claim 1 further comprising:
injecting an acid or acid source into the wellbore;
contacting at least a portion of the treatment fluid with the acid or acid source; and
breaking the invert emulsion.

3. The method of claim 1, wherein n is an integer in the range of from 1 to 4.

4. The method of claim 1, wherein n is 1.

5. The method of claim 1 further comprising using the treatment fluid to drill at least a portion of the wellbore penetrating at least a portion of the subterranean formation.

6. A method comprising:

preparing a treatment fluid comprising an invert emulsion by mixing an aqueous fluid, an oleaginous fluid, and an amine surfactant emulsifier using a blender, wherein the invert emulsion comprises an aqueous internal phase that comprises the aqueous fluid, an oleaginous continuous phase that comprises the oleaginous fluid, and the amine surfactant emulsifier has the molecular structure

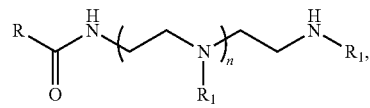

wherein n is an integer in the range of from 1 to 5, R is a $C_{10}$ to $C_{25}$ hydrocarbon chain, a terminal $R_1$ is selected from the group consisting of: a hydrogen,

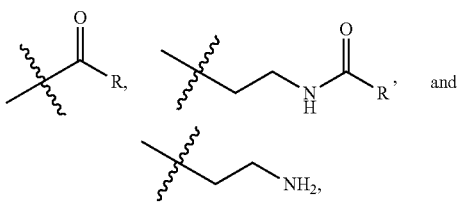

and a non-terminal $R_1$ is selected from the group consisting of:

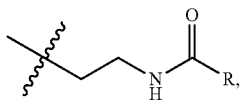

and
placing the treatment fluid in a wellbore penetrating at least a portion of a subterranean formation.

7. The method of claim 6 further comprising:
injecting an acid or acid source into the wellbore;
contacting at least a portion of the treatment fluid with the acid or acid source; and
breaking the invert emulsion.

8. The method of claim 7, wherein the step of breaking the invert emulsion further comprises protonating the amine surfactant emulsifier.

9. The method of claim 6 further comprising using the treatment fluid to drill at least a portion of the wellbore penetrating at least a portion of the subterranean formation.

* * * * *